(12) United States Patent
Gupta et al.

(10) Patent No.: US 11,726,913 B2
(45) Date of Patent: Aug. 15, 2023

(54) USING TRACK STATUS INFORMATION ON ACTIVE OR INACTIVE STATUS OF TRACK TO DETERMINE WHETHER TO PROCESS A HOST REQUEST ON A FAST ACCESS CHANNEL

(71) Applicant: INTERNATIONAL BUSINESS MACHINES CORPORATION, Armonk, NY (US)

(72) Inventors: Lokesh Mohan Gupta, Tucson, AZ (US); Beth Ann Peterson, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/466,535

(22) Filed: Sep. 3, 2021

(65) Prior Publication Data
US 2023/0070794 A1    Mar. 9, 2023

(51) Int. Cl.
*G06F 12/0815*    (2016.01)
*G06F 13/16*    (2006.01)

(52) U.S. Cl.
CPC ...... *G06F 12/0815* (2013.01); *G06F 13/1684* (2013.01); *G06F 2212/1008* (2013.01)

(58) Field of Classification Search
None
See application file for complete search history.

(56) References Cited

U.S. PATENT DOCUMENTS 5,579,503 A * 11/1996 Osborne ............... G06F 13/128
                                                                711/119
6,148,359 A    11/2000 Elkhoury et al.
6,272,604 B1    8/2001 Nunez et al.
(Continued)

FOREIGN PATENT DOCUMENTS

CN    109558337 A    4/2019
CN    111837102 A    10/2020
CN    11188106 A    11/2020

OTHER PUBLICATIONS

H. Kim, et al., "Flash-Conscious Cache Population for Enterprise Database Workloads," IBM Corporation, ADMS, Sep. 2014, 12 pages.
(Continued)

*Primary Examiner* — Kaushikkumar M Patel
(74) *Attorney, Agent, or Firm* — Konrad Raynes Davda & Victor LLP; David W. Victor

(57) ABSTRACT

Provided are a computer program product, system, and method for using track status information on active or inactive status of track to determine whether to process a host request on a fast access channel. A host request to access a target track is received on a first channel to the host. A determination is made as to whether the target track has active or inactive status. The target track has active status when at least one process currently maintains a lock on the target track that prevents access and the target track has inactive status when no process maintains a lock on the target track that prevents access. Fail is returned to the host to cause the host to resend the host request on a second channel in response to the target track having the active status. The first channel has lower latency than the second channel.

20 Claims, 5 Drawing Sheets

(56) References Cited

U.S. PATENT DOCUMENTS

| | | |
|---|---|---|
| 6,275,897 B1 | 8/2001 | Bachmat |
| 6,393,523 B1 | 5/2002 | Peng et al. |
| 6,438,661 B1 * | 8/2002 | Beardsley ............ G06F 11/1435 |
| | | 711/144 |
| 6,457,101 B1 | 9/2002 | Bauman et al. |
| 10,691,566 B2 | 6/2020 | Anderson et al. |
| 10,712,953 B2 | 7/2020 | Crawford et al. |
| 11,023,383 B2 | 6/2021 | Anderson et al. |
| 11,151,037 B2 | 10/2021 | Gupta et al. |
| 2006/0080510 A1 | 4/2006 | Benhase et al. |
| 2008/0320262 A1 * | 12/2008 | McKenney ............. G06F 9/526 |
| | | 711/163 |
| 2010/0257321 A1 | 10/2010 | Gupta |
| 2015/0127908 A1 | 5/2015 | Ghai et al. |
| 2016/0127493 A1 * | 5/2016 | Shalom .................. G06F 13/28 |
| | | 709/213 |
| 2017/0124000 A1 | 5/2017 | Ash et al. |
| 2017/0124001 A1 | 5/2017 | Ash et al. |
| 2019/0034303 A1 * | 1/2019 | Anderson ........... G06F 12/0842 |
| 2021/0042241 A1 | 2/2021 | Gupta et al. |
| 2021/0049109 A1 | 2/2021 | Gupta et al. |
| 2021/0216459 A1 | 7/2021 | Benhanokh et al. |
| 2022/0121395 A1 | 4/2022 | Brewer |

OTHER PUBLICATIONS

U.S. Appl. No. 17/466,558, filed Sep. 3, 2021.
U.S. Appl. No. 17/389,315, filed Jul. 29, 2021.
Office Action dated Jul. 11, 2022, pp. 20, U.S. Appl. No. 17/466,558.
PCT Search Report and Written Opinion dated Sep. 29, 2022, 9pp., for Application No. PCTCN2022/106480.
Response dated Sep. 14, 2022, 13pp. to Office Action dated Nov. 7, 2022, 20pp., U.S. Appl. No. 17/466,558.
PCT Search Report and Written Opinion dated Aug. 26, 2022, 8pp., for Application No. PCT/CN2022/103651.
Response dated Sep. 14, 2022, 13pp. to Office Action dated Jul. 11, 2022, pp. 20, U.S. Appl. No. 17/466,558.
Final Office Action dated Dec. 8, 2022, pp. 42, for U.S. Appl. No. 17/466,558.
Notice of Allowance dated Apr. 3, 2023, pp. 30, for U.S. Appl. No. 17/466,558.

* cited by examiner

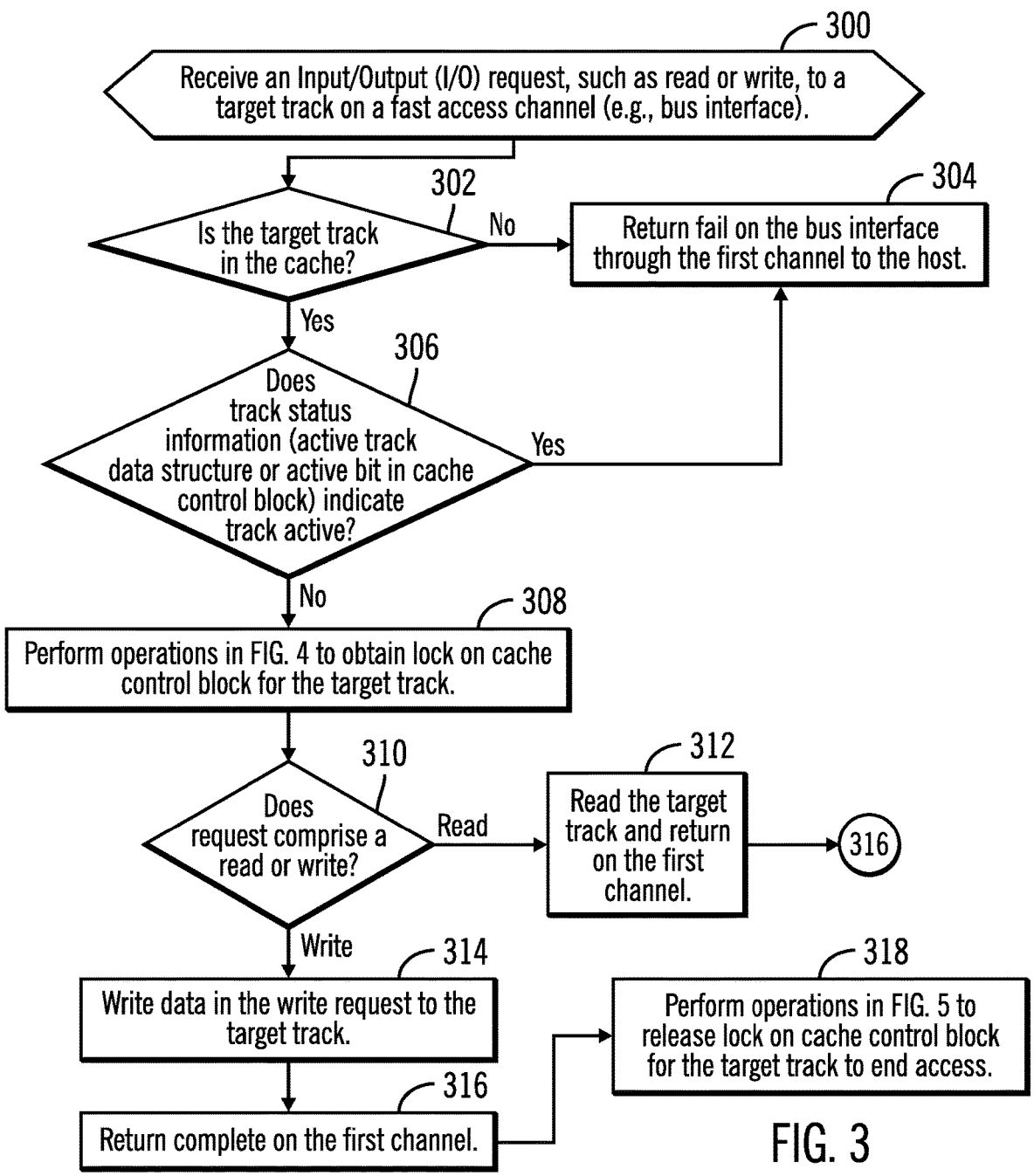

USING TRACK STATUS INFORMATION ON ACTIVE OR INACTIVE STATUS OF TRACK TO DETERMINE WHETHER TO PROCESS A HOST REQUEST ON A FAST ACCESS CHANNEL

BACKGROUND OF THE INVENTION

1. Field of the Invention

The present invention relates to a computer program product, system, and method for using track status information on active or inactive status of track to determine whether to process a host request on a fast access channel.

2. Description of the Related Art

In a storage environment, a host system may communicate a read/write request to a connected storage system over a fast access channel, such as a bus interface, e.g., a such as the Peripheral Component Interconnect Express (PCIe) interface. If the data is in a cache of the storage system, i.e., a read hit, then the data may be returned quickly to the host system over the faster access channel where the host thread for the read/write request is in a spin loop waiting for the request to complete. This saves processor time associated with a context swap, which deactivates the thread and reactivates the thread in response to an interrupt when a response to the read/write request is received. If the data for the read/write request sent on the fast channel is not in cache, then the storage system may fail the read/write request and the host system may communicate the same read/write request over a storage area network via a host adaptor, which is slower than processing the I/O request over the bus, e.g., PCIe interface. Communicating the read/write request over the second channel requires the host system to perform a context switch from the task handling the read/write request to another task while waiting for the read/write request to complete.

There is a need in the art for improved techniques for managing host requests on a fast access channel.

SUMMARY

Provided are a computer program product, system, and method for using track status information on active or inactive status of track to determine whether to process a host request on a fast access channel. A host request to access a target track is received on a first channel to the host. A determination is made as to whether the target track has active or inactive status from track status information. The target track has active status when at least one process currently maintains a lock on the target track that prevents access and the target track has inactive status when no process maintains a lock on the target track that prevents other processes from accessing. Fail is returned to the host to cause the host to resend the host request on a second channel in response to the determining that the target track has the active status, wherein the first channel has lower latency than the second channel.

BRIEF DESCRIPTION OF THE DRAWINGS

FIG. 2 illustrates an embodiment of a cache control block.

FIG. 3 illustrates an embodiment of processing an Input/Output (I/O) request to a target track on a fast access channel.

DETAILED DESCRIPTION

In current storage environments using a fast access channel, such as the PCIe bus interface, for I/O requests that must complete within a threshold time, the storage system may fail the request if the target track is not already in cache. However, even if the track is in cache, significant latency may be experienced if the track target is being accessed by another process and a lock must be obtained in order to access the target track in the cache to process the host I/O request on the fast channel. This latency to access a track currently being accessed by other processors may result in unacceptable latency beyond the threshold time to complete processing a host request on the fast channel.

Described embodiments provide improvements to computer technology for host access requests submitted on a fast access channel by providing track status information, accessible through an active track data structure or an active bit in the cache control block for the target track, that may be used to determine if the target track of the host request on the fast channel has an active status, i.e., being accessed by another process, or an inactive status, not being accessed by another process. If the target track has an active status, then the host request on the fast channel is failed to avoid the latency due to waiting to obtain a lock on the target track in the cache while another process is accessing. If the target track in the cache has an inactive status, then the host request may be processed on the fast access channel because the target track may be immediately accessed in the cache to complete the processing of the host request.

Figure 1:
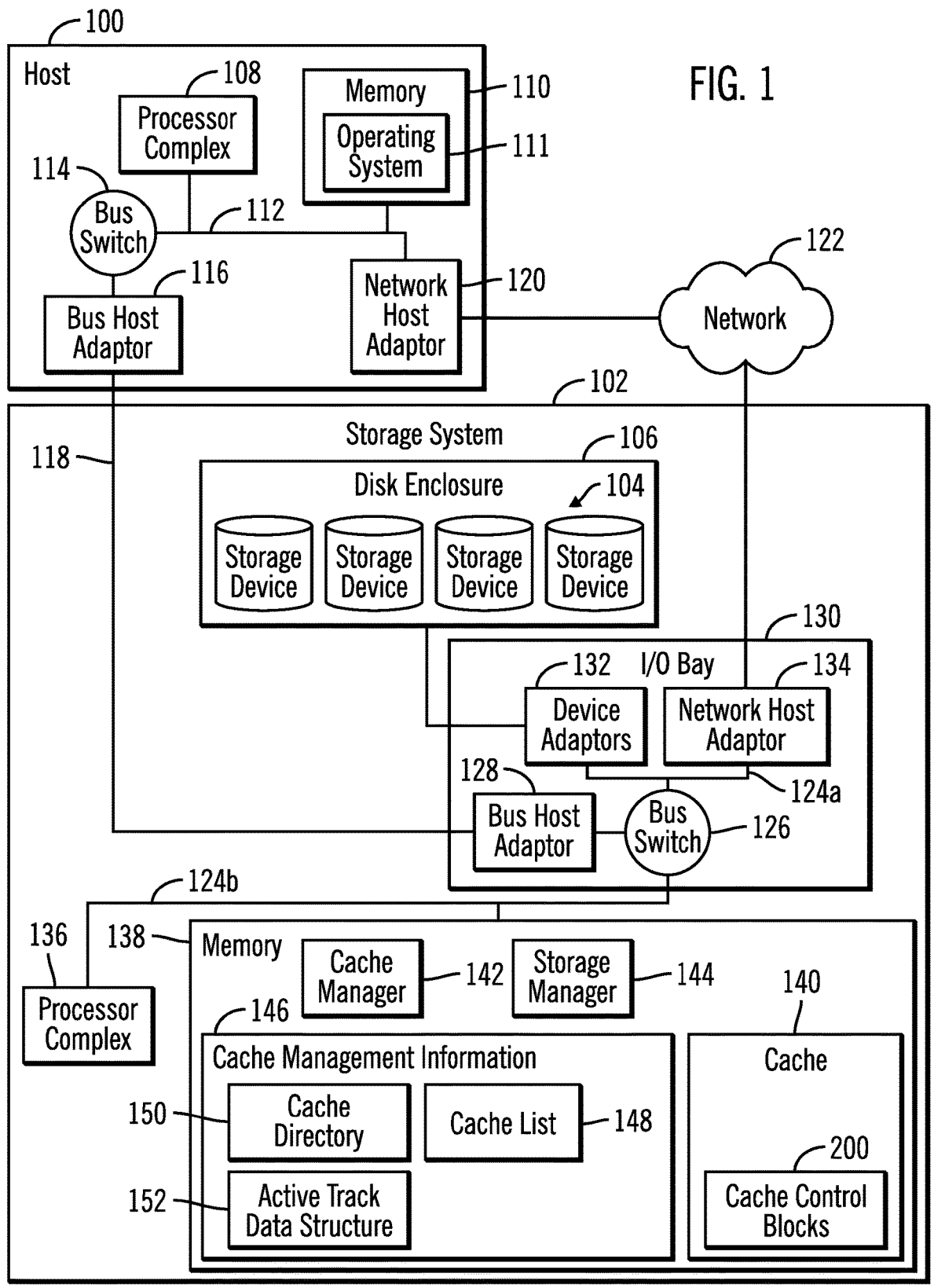
FIG. 1 illustrates an embodiment of a storage environment.

FIG. 1 illustrates an embodiment of a storage environment in which a host 100 directs read and write requests to a storage system 102 to access tracks in volumes configured in storage devices 104 in a disk enclosure 106. The host 100 includes a processor complex 108 of one or more processor devices and a memory 110 including an operating system 111 executed by the processor complex 108. The host operating system 111 generates read and write requests to tracks configured in the storage devices 104. The host 100 includes hardware to communicate read and write requests on two different channels. A first channel, also referred to as a fast channel or fast access channel, is a bus interface, such as a Peripheral Component Interconnect Express (PCIe), including a bus 112, a bus switch 114 to connect one or more devices on the bus 112, including the processor complex 108, a memory system 110, and a bus host adaptor 116 to extend the bus interface over an external bus interface cable 118 to the storage system 102. Additional bus interface technology to extend the bus interface may be utilized, including PCIe extender cables or components, such as a distributed PCIe switch, to allow PCIe over Ethernet, such as with the ExpEther technology. A second channel, also referred to as slower channel, to connect the host 100 and storage system 102 uses a network host adaptor 120, connected to the bus 112, that connects to a separate network 122 over which the host 100 and storage system 102 additionally communicate. The first channel through the bus interface may comprise a faster access channel than the network 122 interface through the network host adaptor 120.

The storage system 102 includes a bus interface comprising a bus 124a, 124b, a bus switch 126 to connect to endpoint devices on the bus 124a, 124b, and a bus host adaptor 128 to connect to the external bus interface cable 118 to allow communication over the bus interface to the host 100 over the first channel. The storage system 102 includes an Input/Output bay 130 having the bus host adaptor 128, one or more device adaptors 132 to connect to the storage devices 104, and one or more network host adaptors 134 to connect to the network 122 and host systems.

The storage system 102 includes a processor complex 136 of one or more processor devices and a memory 138 having a cache 140 to cache tracks accessed by the connected hosts 100. The memory 138 includes a cache manager 142 and a storage manager 144. The storage manager 144 manages access requests from processes in the hosts 100 and storage system 102 for tracks in the storage 104. The devices 136, 138, 128, 132, and 134 connect over the bus interface implemented in the bus lanes 124a, 124b and bus switch 126.

The cache manager 142 maintains accessed tracks in the cache 140 for future read access to the tracks to allow the accessed tracks to be returned from the faster access cache 140 instead of having to retrieve from the storage 104. Further, tracks in the cache 140 may be updated by writes. A track may comprise any unit of data configured in the storage 110, such as a track, Logical Block Address (LBA), storage cell, group of cells (e.g., column, row or array of cells), sector, segment, etc., which may be part of a larger grouping of tracks, such as a volume, logical device, etc.

In certain implementations, such as with the International Business Machines Corporation ("IBM") Z/OS® operating system, each segment may have an associated descriptor referred to as a cache segment control block (CSCB), where one of the CSCBs is cast as a cache control block, referred to as cache directory control block (CDCB). The cache 140 may be divided into 4K segments. Each track in cache can have up to seventeen CSCBs. One of the CSCBs in the track is designated as the cache control block, also referred to as a CDCB (Cache Directory Control Block) and holds all the track related control information. There is one cache control block for each track in the cache 140 providing metadata on the track in the cache 140. (Z/OS is a registered trademark of IBM throughout the world).

The cache manager 142 maintains cache management information 146 in the memory 138 to manage read (unmodified) and write (modified) tracks in the cache 140. The cache management information 146 may include a least recently used (LRU) cache list 148 in which to indicate tracks in the cache 140 to determine which track to demote from the cache 140; a cache directory 150 providing an index of cache control blocks 200 or segment descriptors to locations of segments in cache 140 having the cache control block 200 or segment identified in the cache directory 126; and an active track data structure 152 indicating active tracks in the cache 140.

In one embodiment, the active track data structure 152 may comprise a bitmap having a bit for each segment in the cache 140. A track may be allocated multiple segments in the cache 140, and the cache control block 200, for a track, having metadata for the track, may reside in one of the segments allocated to the track. The bit in the bitmap 152 corresponding to the cache control block 200, for the track may be set to indicate the track is active or inactive. The bits in the active track data structure 152 bitmap representing segments having track data and not the cache control block 200, are left unused. Portions or bits of the active track data structure 152 bitmap may be implemented in cache lines that need to be locked to process the bits to determine whether corresponding cache control blocks 200, are active.

In certain embodiments, the cache directory 150 may be implemented as a scatter index table, where a track address or cache control block identifier is hashed to an entry in the table. If the cache 140 has data for that cache control block or track, the entry in the cache directory 150 to which the value hashes would have a pointer to a location in cache 140 where the cache control block 200, segment for a track is stored.

The cache manager 142 and storage manager 144 are shown in FIG. 1 as program code loaded into the memory 138 and executed by the processor complex 136. Alternatively, some or all of the functions may be implemented as microcode or firmware in hardware devices in the storage system 102, such as in Application Specific Integrated Circuits (ASICs).

In certain embodiments, there may be multiple hosts 100 that connect to the storage system 102 over the first and second channels to access tracks in the storage devices 104. In such case, the storage system 102 would have at least one bus host adaptor 128 to connect to the bus interface 118 of each connected host 100 and one or more network host adaptors 134 to connect to the network host adaptors 120 on the hosts 100.

In one embodiment, the bus interfaces 112, 114, 116, 118, 124a, 124b, 126, and 128 may comprise a Peripheral Component Interconnect Express (PCIe) bus interface technology. In alternative embodiments, the bus interfaces 112, 114, 116, 118, 124a, 124b, 126, and 128 may utilize suitable bus interface technology other than PCIe. The bus host adaptors 116 and 128 may comprise PCIe host adaptors that provide the interface to connect to the PCIe cable 118. The network 122 may comprise a Storage Area Network (SAN), a Local Area Network (LAN), a Wide Area Network (WAN), the Internet, an Intranet, etc., and the network host adaptors 120, 134 provide the network 122 connections between the hosts 100 and storage system 102.

The storage system 102 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world). The host operating system 111 may comprise an operating system such as Z Systems Operating System (Z/OS®) from International Business Machines Corporation ("IBM") or other operating systems known in the art. (Z/OS is a registered trademark of IBM throughout the world).

The storage devices 104 in the disk enclosure 106 may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STT-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 104 in the disk enclosure 106 may comprise heterogeneous storage devices from different vendors and different types of storage devices, such as a first type of storage devices, e.g., hard disk drives, that have a slower data transfer rate than a second type of storage devices, e.g., SSDs.

FIG. 2 illustrates an embodiment of an instance of a cache control block 200, for one of the tracks in the cache 140, including, but not limited to, a cache control block identifier 202, such as an index value of the cache control block 200*k*; the cache list 204 in which the track associated cache control block 200, is indicated; a position in the LRU cache list 206 where the track is indicated; an active bit 208 indicating whether the track is indicated as having active status or inactive status in the active track data structure 152; usage information 210 providing usage statistics on the track in the cache, such as active user count, active write count, lock counts, modified count, waiters, etc.; and a demote status 212 indicating whether the track identified by the cache control block 200, is to be demoted from the cache 140. Additional information may be included in the cache control block 200, not mentioned herein that is used to manage the track in the cache 140.

The active bit 208 provides an optimization to indicate whether the active track data structure 152 indicates the track is active. This allows a process to determine that the track is active without having to obtain a lock on the cache line to read the bit in the active track data structure 152 for the cache control block 200*k*. This allows processes during normal operations to determine whether the bit in the active track data structure 152 needs to be reset without having to lock the cache line having the bit to read to determine if that bit indicates active or inactive.

FIG. 3 illustrates an embodiment of operations performed by the cache manager 142 or storage manager 144 to process an Input/Output ("I/O") request, e.g., read or write, to a target track on the low latency first channel 118. Upon receiving (at block 300) an I/O request to a target track on the fast access channel 118, if (at block 302) the target track is not in the cache 140, then the storage manager 144 returns (at block 304) fail on the first channel 118 to the host to cause the host to resubmit the I/O request on the higher latency second channel 122 via the network host adaptors 120, 134. If (at block 302) the target track is in the cache 140, then the cache manager 142 determines (at block 306) whether track status information, such as the active track data structure 152 or the active bit 208 in the cache control block 200T for the target track, indicates the track is active, i.e., other processes are currently accessing the track, such as holding a lock on the track. If (at block 306) the target track has an active status, then control proceeds to block 304 to return fail even though the target track is in the cache 140.

Figure 4:
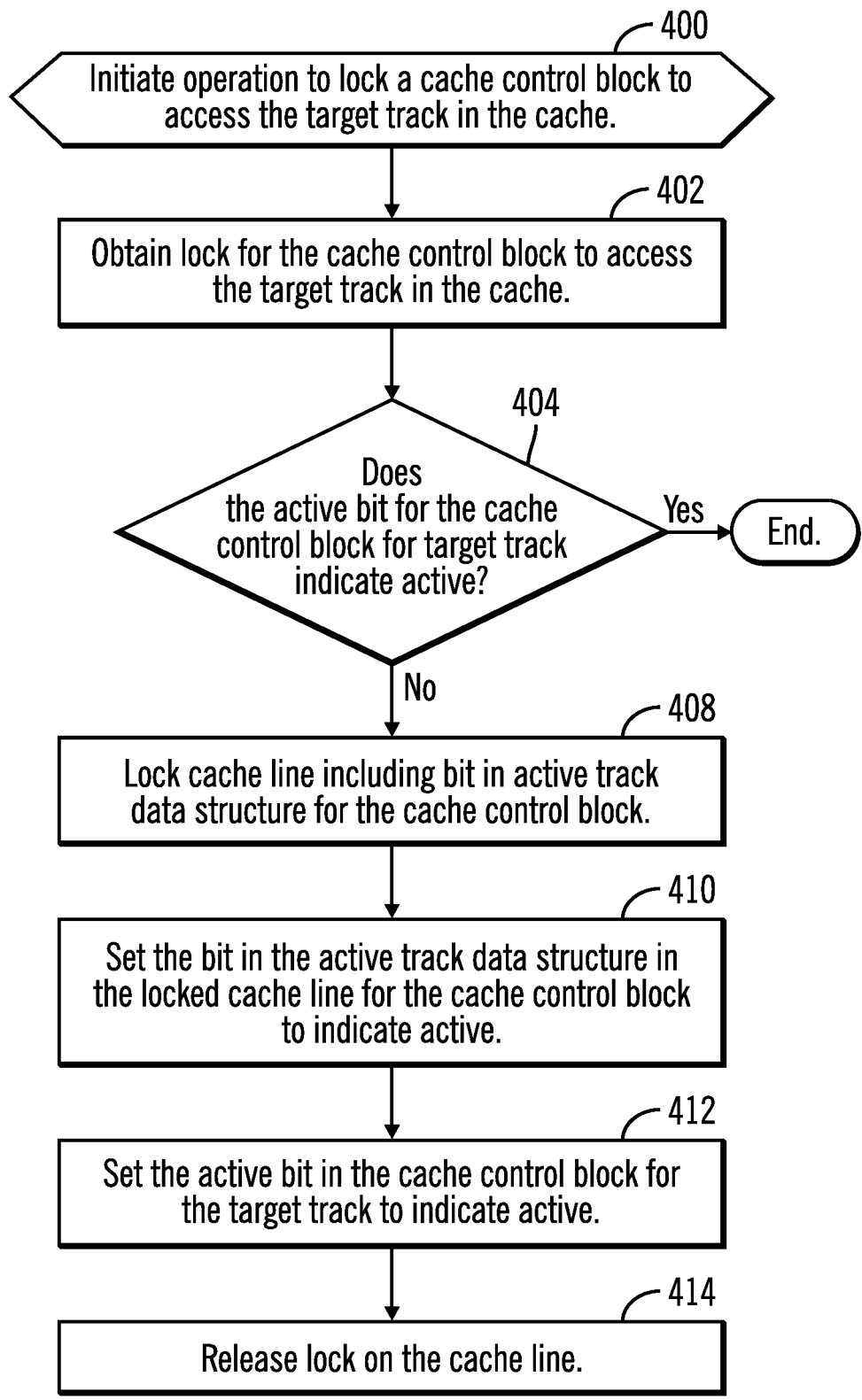
FIG. 4 illustrates an embodiment of operations to lock a cache control block to access a target track in cache.
Figure 5:
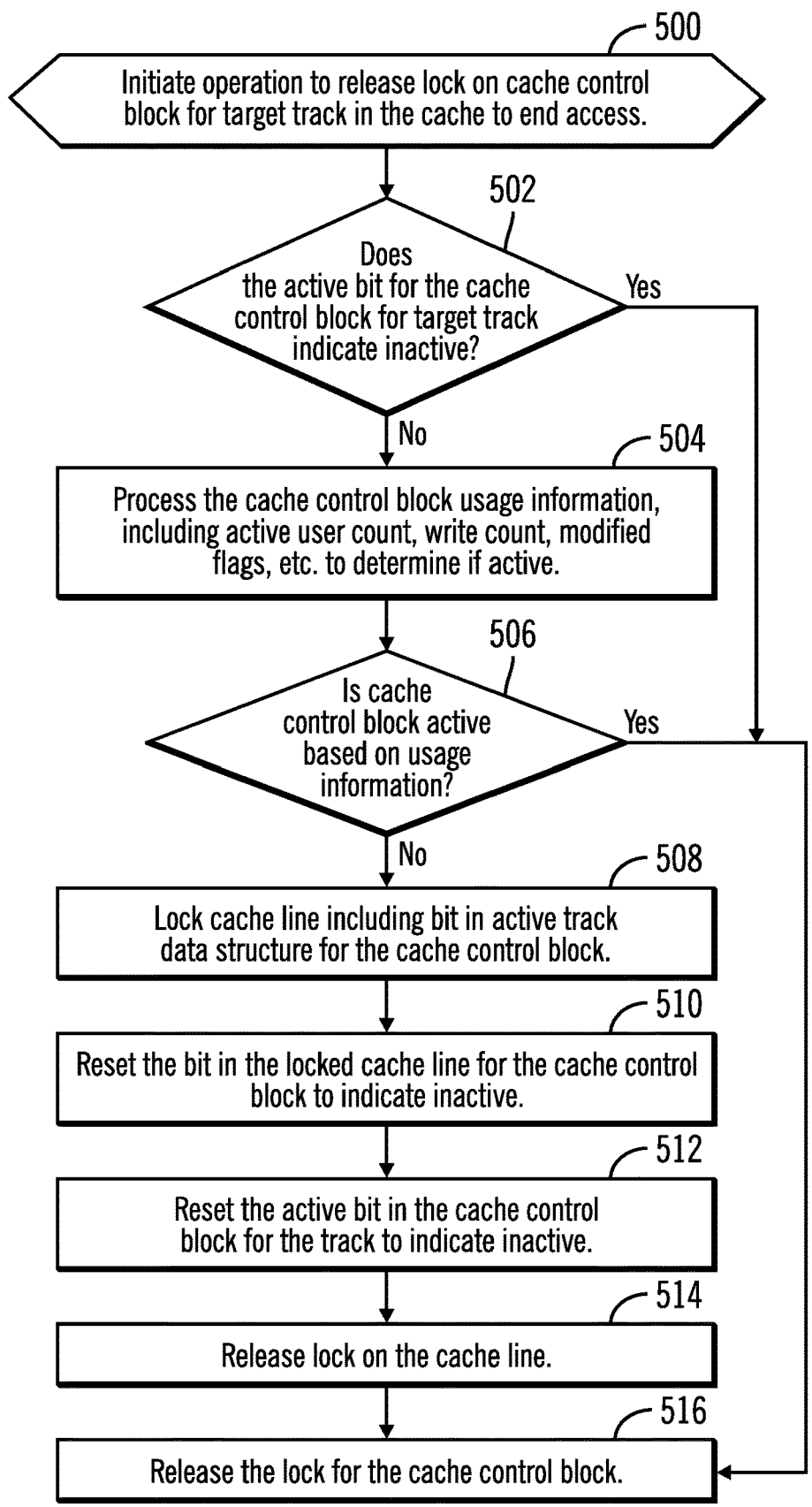
FIG. 5 illustrates an embodiment of operations to release the lock on the cache control block to end access to the target track.

If (at block 306) the target track has inactive status, i.e., no process is currently accessing the track to prevent the host I/O request from obtaining immediate access, then the operations in FIG. 4 are performed (at block 308) to obtain a lock on the cache control block 200T for the target track. If (at block 310) the request comprises a read request, then the cache manager 142 reads the target track from the cache 140 and returns the read target track to the host 100 on the first channel 118. If (at block 310) the target request comprises a write, then the write data in the write request is written (at block 314) to the target track. After performing the requested read or write, complete is returned (at block 316) to the host 100 on the first channel 118. The operations in FIG. 5 are then performed (at block 318) to release the lock on the cache control block 200T for the target track to end access.

With the embodiment of operations of FIG. 3, during a fast write over the bus interface 118 or first channel, if track status information, such as in the active track data structure 152 or the active bit 208 of the cache control block 200T for the target track, indicates that the target track is not currently being accessed, e.g., no locks are held on the target track, then the host request may access the target track without latency. In such case, the read/write request is allowed to proceed when the transaction can be processed very quickly because the target track can be immediately accessed without having to wait for another process to relinquish a lock or access to the target track in the cache 140. However, if the track status information indicates the target track has an active status, then the host read/write request is failed because the transaction will not likely complete within a fast time threshold. This determination is important to avoid host delays in processing other tasks while the host processor is spinning on the thread handling the read/write request while waiting for the read/write request to complete.

If the target track can be accessed immediately without having to wait for other processes to release access to the target track, then there is a high likelihood the read/write can complete on the fast bus interface channel 118 within the time required to avoid the host processor holding the thread for too long, which causes other host 100 I/O requests to be queued and delayed. If the target track status is active and the host I/O request needs to wait for other processes to relinquish access to the target track, then it is unlikely the read/write request will complete within the time threshold for the host processor to spin on the thread for the read/write request, and failure is returned. Returning failure when the target track status is active causes the host thread waiting on the read/write request task to be deactivated and the host processor may context switch to processing other tasks, and then the read/write request is retried on the second network channel 122 during the context switch.

FIG. 4 illustrates an embodiment of operations performed by the cache manager 142 to lock the target track cache control block 200T to access the target track in the cache 140. Upon initiating (at block 400) the operation to obtain a lock on the target track cache control block 200T, the cache manager 142 obtains (at block 402) a lock for the target track cache control block 200T to access, which lock may be obtained through the cache directory 150. If (at block 404) the active bit 208 for the target track cache control block 200T indicates active, then control ends because this is the correct setting for the cache control block 200T being accessed. If (at block 404) the active bit 208 indicates inactive, then the cache manager 142 obtains (at block 408) a lock on the cache line including the bit in the active track data structure 152 for the target track cache control block 200T. The bit in the locked cache line of the active track data structure 152 is then set (at block 410) to indicate active as the cache control block 200T and track are being accessed. The active bit 208 in the target track cache control block 200T is also set (at block 412) to indicate active. The lock on the cache line including the set bit for the target track cache control block 200T in the active track data structure 152 is then released.

With the embodiment of operations of FIG. 4, upon accessing the target track cache control block 200T to access the target track in the cache 140, a determination is made as to whether the active bit in the active track data structure 152 needs to be updated. In certain embodiments, to determine if an update is needed, an exclusive lock is obtained on the cache line having the bit to update by checking an active bit 208 in the cache control block to determine whether the active track data structure 128 does in fact need to be updated. This optimization avoids the need to lock and access a bit in the active track data structure 128 by first checking if the active bit 208 actually needs to be set or reset. Further, the active track data structure 152 is updated with current information on an active status for the target track to maintain the active track data structure 152 with current information on active track status to better process host requests on the fast bus channel 118.

FIG. 5 illustrates an embodiment of operations performed by the cache manager 142 to release a lock on a target track cache control block 200T after completing access to the target track in the cache 140. Upon initiating (at block 500) an operation to release a lock for the target track cache control block 200T, the cache manager 142 determines (at block 502) whether the active bit 208 for the cache control block 200, indicates active. If (at block 502) the active bit 208 indicates active, then the cache manager 142 processes (at block 504) the cache control block usage information 210, such as an active user count, write count, modified flags, etc. to determine if the target track cache control block 200T is active based on usage information 210.

If (at block 506) the target track cache control block 200T is inactive based on the usage information 210, contradicting the active bit 208, then the cache manager 142 locks (at block 508) the cache line including the bit in the active track data structure 152 for the target track cache control block 200T and resets (at block 510) the bit in the locked cache line for the cache control block 200T to indicate inactive. The active bit 208 in the cache control block 200T is reset (at block 512) to indicate inactive. The lock on the cache line is released (at block 516) and the lock for the target track cache control block 200T is released. If (at block 502) the active bit for the target track cache control block 200T indicates inactive, then control proceeds to block 516 to release the lock without changing the active bit 208 which already indicates inactive. If (at block 506) the usage information 210 indicates the track is active, then control proceeds to block 516 to release the lock without changing the active bit 208 which already indicates active.

With the embodiment of operations of FIG. 5, upon releasing access to the target track/cache control block 200T, a determination is made as to whether the active bit in the active track data structure 152 needs to be updated to indicate inactive by checking an active bit 208 in the cache control block to determine whether the active track data structure 152 does in fact need to be updated to indicate inactive. This optimization avoids the need to lock and access a bit in the active track data structure 128 by checking if the active bit 208 indicates the bit in the active data structure 152 needs to be reset. Further, if the active bit 208 indicates the released target track is inactive, then the cache manager 142 confirms that other usage information 210 indicate that the target track is still active even though the active track data structure 152/active bit 208 indicates the track is inactive. If the released target track is determined to be active even though active bit 208 and the active track data structure 152 indicates the track is inactive, then the information 208, 152 needs to be reset to indicate active for the target track to reflect the current status of the track based on the usage information 210. This updates the active track data structure 152 with current information on an active status for a target track to optimize subsequent host I/O requests on the fast access bus interface 118.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
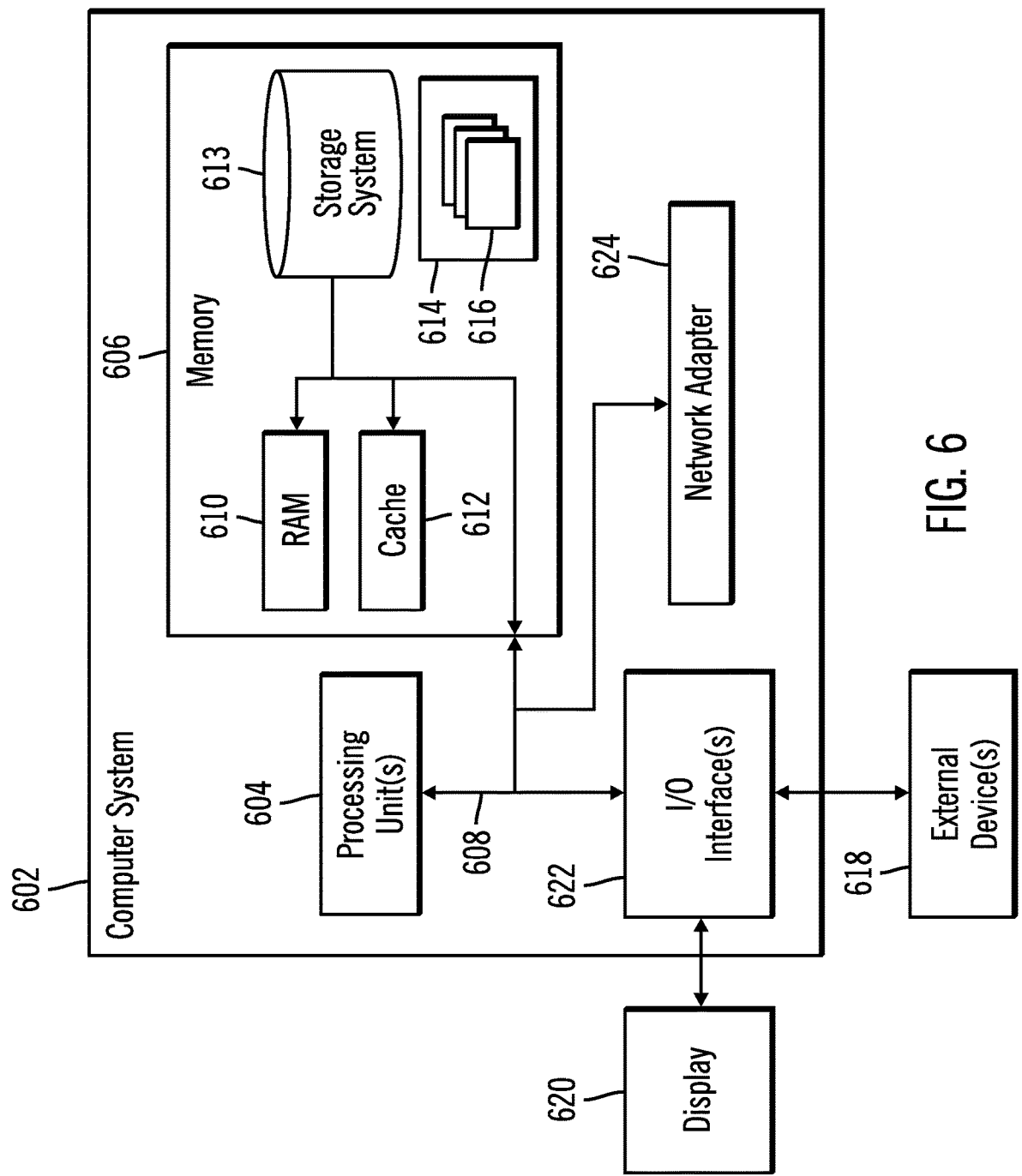
FIG. 6 illustrates an embodiment of a computer architecture used with described embodiments.

The computational components of FIG. 1, including the host 100 and storage system 102 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing read and write requests from a host to tracks in storage cached in a cache, the computer program product comprising a computer readable storage medium having computer readable program code embodied therein that is executable to perform operations, the operations comprising:
   receiving, on a first channel to the host, a host request to access a target track;
   determining whether the target track has active or inactive status from track status information, wherein the target track has active status when at least one process currently maintains a lock on the target track that prevents access and wherein the target track has inactive status when no process maintains a lock on the target track that prevents other processes from accessing; and
   returning fail to the host to cause the host to resend the host request on a second channel in response to the determining that the target track has the active status, wherein the first channel has lower latency than the second channel.

2. The computer program product of claim 1, wherein the track status information comprises active bits in cache control blocks for tracks to indicate the active status or the inactive status for the tracks, wherein the determining whether the target track has the active or the inactive status comprises determining whether an active bit in a cache control block for the target track indicates the active or the inactive status.

3. The computer program product of claim 2, wherein the operations further comprise:
   maintaining an active track data structure indicating tracks in the cache that have an active status; and
   setting an active bit in a cache control block for a track to indicate active for the track indicated as active in the active track data structure.

4. The computer program product of claim 1, wherein track status information comprises a bitmap including bits for cache control blocks, wherein a bit for a cache control block indicates whether a track identified by the cache control block is active or inactive, wherein the determining whether the target track has active or inactive status comprises determining whether a bit for a cache control block for the target track in the bitmap indicates the active or inactive status.

5. The computer program product of claim 1, wherein the operations further comprise:
   determining whether the target track is in the cache in response to receiving the host request, wherein the determining whether the target track has active status is performed in response to determining that the target track is in the cache; and
   returning fail to the host to cause the host to resend the host request on the second channel in response to determining that the target track is not in the cache.

6. The computer program product of claim 5, wherein the host request comprises a read request, wherein the operations further comprise:
   processing the host request to read the target track in the cache and return the target track on the first channel in response to determining that the target track is in the cache and has the inactive status.

7. The computer program product of claim 1, wherein the host request comprises a read request, wherein the operations further comprise:

processing the read request to obtain a lock on the target track in the cache in response to determining that the target track has the inactive status; and reading the target track in the cache in response to obtaining the lock; and returning the read target track on the first channel to the host.

8. A system for managing read and write requests from a host to tracks in storage cached in a cache, comprising:

a processor; and a computer readable storage medium having computer readable program code embodied therein that when executed by the processor performs operations, the operations comprising:

receiving, on a first channel to the host, a host request to access a target track;

determining whether the target track has active or inactive status from track status information, wherein the target track has active status when at least one process currently maintains a lock on the target track that prevents access and wherein the target track has inactive status when no process maintains a lock on the target track that prevents other processes from accessing; and returning fail to the host to cause the host to resend the host request on a second channel in response to the determining that the target track has the active status, wherein the first channel has lower latency than the second channel.

9. The system of claim 8, wherein the track status information comprises active bits in cache control blocks for tracks to indicate the active status or the inactive status for the tracks, wherein the determining whether the target track has the active or the inactive status comprises determining whether an active bit in a cache control block for the target track indicates the active or the inactive status.

10. The system of claim 9, wherein the operations further comprise:

maintaining an active track data structure indicating tracks in the cache that have an active status; and setting an active bit in a cache control block for a track to indicate active for the track indicated as active in the active track data structure.

11. The system of claim 8, wherein track status information comprises a bitmap including bits for cache control blocks, wherein a bit for a cache control block indicates whether a track identified by the cache control block is active or inactive, wherein the determining whether the target track has active or inactive status comprises determining whether a bit for a cache control block for the target track in the bitmap indicates the active or inactive status.

12. The system of claim 8, wherein the operations further comprise:

determining whether the target track is in the cache in response to receiving the host request, wherein the determining whether the target track has active status is performed in response to determining that the target track is in the cache; and returning fail to the host to cause the host to resend the host request on the second channel in response to determining that the target track is not in the cache.

13. The system of claim 12, wherein the host request comprises a read request, wherein the operations further comprise:

processing the host request to read the target track in the cache and return the target track on the first channel in response to determining that the target track is in the cache and has the inactive status.

14. The system of claim 8, wherein the host request comprises a read request, wherein the operations further comprise:

processing the read request to obtain a lock on the target track in the cache in response to determining that the target track has the inactive status; and reading the target track in the cache in response to obtaining the lock; and returning the read target track on the first channel to the host.

15. A method for managing read and write requests from a host to tracks in storage cached in a cache, comprising:

receiving, on a first channel to the host, a host request to access a target track;

determining whether the target track has active or inactive status from track status information, wherein the target track has active status when at least one process currently maintains a lock on the target track that prevents access and wherein the target track has inactive status when no process maintains a lock on the target track that prevents other processes from accessing; and returning fail to the host to cause the host to resend the host request on a second channel in response to the determining that the target track has the active status, wherein the first channel has lower latency than the second channel.

16. The method of claim 15, wherein the track status information comprises active bits in cache control blocks for tracks to indicate the active status or the inactive status for the tracks, wherein the determining whether the target track has the active or the inactive status comprises determining whether an active bit in a cache control block for the target track indicates the active or the inactive status.

17. The method of claim 16, further comprising:

maintaining an active track data structure indicating tracks in the cache that have an active status; and setting an active bit in a cache control block for a track to indicate active for the track indicated as active in the active track data structure.

18. The method of claim 15, further comprising:

determining whether the target track is in the cache in response to receiving the host request, wherein the determining whether the target track has active status is performed in response to determining that the target track is in the cache; and returning fail to the host to cause the host to resend the host request on the second channel in response to determining that the target track is not in the cache.

19. The method of claim 18, wherein the host request comprises a read request, further comprising:

processing the host request to read the target track in the cache and return the target track on the first channel in response to determining that the target track is in the cache and has the inactive status.

20. The method of claim 15, wherein the host request comprises a read request, further comprising:

processing the read request to obtain a lock on the target track in the cache in response to determining that the target track has the inactive status; and reading the target track in the cache in response to obtaining the lock; and returning the read target track on the first channel to the host.

* * * * *